United States Patent
Becka et al.

(10) Patent No.: US 11,649,891 B2
(45) Date of Patent: May 16, 2023

(54) TRANSMISSION AND USE OF A RING COOLER

(71) Applicant: Flender GmbH, Bocholt (DE)

(72) Inventors: Simon Becka, Wesel (DE); Christoph Messink, Bocholt (DE); Elmar Rickert, Bocholt (DE); Franz Schmeink, Bocholt (DE); Lena Striemann, Rhede (DE)

(73) Assignee: FLENDER GMBH, Bocholt (DE)

( * ) Notice: Subject to any disclaimer, the term of this patent is extended or adjusted under 35 U.S.C. 154(b) by 1085 days.

(21) Appl. No.: 16/336,755

(22) PCT Filed: Sep. 18, 2017

(86) PCT No.: PCT/EP2017/073420
§ 371 (c)(1),
(2) Date: Mar. 26, 2019

(87) PCT Pub. No.: WO2018/059980
PCT Pub. Date: Apr. 5, 2018

(65) Prior Publication Data
US 2022/0381332 A1 Dec. 1, 2022

(30) Foreign Application Priority Data

Sep. 27, 2016 (EP) .................................... 16190741

(51) Int. Cl.
*F16H 57/04* (2010.01)
(52) U.S. Cl.
CPC ..... *F16H 57/0416* (2013.01); *F16H 57/0423* (2013.01); *F16H 57/0436* (2013.01)
(58) Field of Classification Search
CPC ............. F16H 57/0436; F16H 57/0416; F16H 57/0415; F16H 57/0423; F16H 57/0417; F16H 57/0493
See application file for complete search history.

(56) References Cited

U.S. PATENT DOCUMENTS

| 5,622,051 | A | 4/1997 | Iida et al. | |
|---|---|---|---|---|
| 2011/0179903 | A1* | 7/2011 | Tietyen | F28D 1/0383 |
| | | | | 74/606 A |
| 2014/0338495 | A1* | 11/2014 | Hayashi | F16H 57/0416 |
| | | | | 74/606 A |

FOREIGN PATENT DOCUMENTS

| DE | 102010025270 A1 | 12/2011 |
|---|---|---|
| DE | 102012022024 A1 | 5/2014 |

(Continued)

OTHER PUBLICATIONS

"PCT International Search Report and Written Opinion of International Searching Authority dated Jan. 19, 2018 corresponding to PCT International Application No. PCT/EP2017/073420 filed Sep. 18, 2017".

*Primary Examiner* — Daniel D Yabut
(74) *Attorney, Agent, or Firm* — Henry M. Feiereisen LLC

(57) ABSTRACT

The invention relates to a transmission (10), preferably a bevel helical transmission, having a transmission housing (1) and having a drive shaft (2.1), on which a fan (9) is mounted, and comprising a ring cooler (4), which surrounds the drive shaft (2.1), oil lines (7.1, 7.2) for transporting transmission oil in an oil circuit from the interior of the transmission housing (1) to the ring cooler (4) and from the ring cooler (4) into the interior of the transmission housing (1), and an air-guiding hood (3.1, 3.2) surrounding the ring cooler (4) for guiding air suctioned by the fan (9) onto the ring cooler (4).

9 Claims, 6 Drawing Sheets

(56) References Cited

FOREIGN PATENT DOCUMENTS

| | | | | |
|---|---|---|---|---|
| EP | 2410210 A1 | * | 1/2012 | ............ F04D 17/06 |
| GB | 2185551 A | | 7/1987 | |
| JP | H039198 A | | 1/1991 | |
| JP | H0669509 U | | 9/1994 | |
| JP | H1061754 A | | 3/1998 | |
| JP | 2007315553 A | | 12/2007 | |
| KR | 20050002984 U | | 7/2008 | |
| WO | WO-2019163316 A1 | * | 8/2019 | ........... F16H 57/028 |

* cited by examiner

TRANSMISSION AND USE OF A RING COOLER

CROSS-REFERENCES TO RELATED APPLICATIONS

This application is the U.S. National Stage of International Application No. PCT/EP20171073420, filed Sep. 18, 2017, which designated the United States and has been published as International Publication No, WO 2018/059980 and which claims the priority of European Patent Application, Serial No, 16190741.5, filed Sep. 27, 2016, pursuant to 35 U.S.C. 119(a)-(d).

BACKGROUND OF THE INVENTION

The invention relates to a transmission, preferably a bevel helical transmission, having a drive shaft on which a fan is mounted, wherein the transmission has an efficient cooling system in the region of the drive shaft.

In a transmission, power loss occurs during operation, in particular due to the friction in the bearings and between the intermeshing toothed wheels, and to the churning losses of the toothed wheels beating in the oil sump. This power loss produces an increase in the temperature of the transmission oil. Since the oil temperature must not exceed a specified threshold, the permissible mechanical load limit of the transmission is limited by the heat that occurs.

In the case of belt conveyor transmissions, it is no longer possible beyond a certain size to dissipate the heat via the surface. This is due to the fact that the surface to volume ratio decreases as the size of the body increases (mouse-elephant).

The thermal load limit of the transmission can be increased by a cooling system for cooling the transmission oil, ideally up to the nominal mechanical load. Various technical solutions exist for cooling the oil of transmissions by means of heat exchangers. External oil cooling systems, e.g. ribbon-cellular radiators arranged next to a transmission, are however often undesirable since they increase the deployment space of the transmission, i.e. they require additional space, and involve high costs.

For many applications, it is not possible to realize oil-water heat exchangers because a water supply is not guaranteed at the deployment site.

There exists a requirement for a cooling solution in which the heat exchanger is arranged directly on the transmission, such that no additional space is required. Furthermore, and even without water cooling, the heat exchanger should be able to achieve very effective cooling of transmission oil that is used for the purpose of lubrication and cooling in the transmission.

SUMMARY OF THE INVENTION

The invention is defined and characterized in the main claims, while the dependent claims describe further features of the invention.

The invention relates to a transmission, preferably a bevel helical transmission, with a transmission housing and a drive shaft. The drive shaft, also referred to as input shaft, is supported in the housing, preferably in a bearing cup. A fan is mounted on the drive shaft, said fan being an axial fan or a radial fan. The transmission comprises a ring cooler which surrounds the drive shaft. The transmission additionally comprises oil lines for transporting transmission oil in an oil circuit from the interior of the transmission housing to the ring cooler and from the ring cooler into the interior of the transmission housing. The transmission also comprises an air-guiding hood which surrounds the ring cooler for the purpose of guiding air that is sucked in by the fan onto the ring cooler.

The invention therefore relates to the use of a ring cooler as a heat exchanger for cooling transmission oil. The ring cooler is attached to the drive side of the transmission in such a way as to surround the drive shaft. The transmission oil is carried through the heat exchanger by means of a pump, preferably a flange pump. A radial fan is mounted on the drive shaft. An air-guiding hood surrounds the ring cooler and that part of the transmission housing which connects to the drive shaft. The ambient air is sucked into the air-guiding hood and through the ring cooler by means of the fan. The air which has been heated in the ring cooler then emerges from the fan.

The object of the invention is to create a compact cooling system in which an oil-air heat exchanger is integrated in the region of the air-guiding hood of the transmission. The transmission oil in this case is pumped by means of a flange pump through a ring cooler which surrounds the drive shaft, also referred to as input shaft. A fan on the drive shaft sucks ambient air into the air-guiding hood and around the pipes, also referred to as oil fins, of the ring cooler. In this case, the pipes of the ring cooler can have a round, angled, or any other desired cross section. In this context, a pipe is any hollow body that is suitable for transporting transmission oil under pressure. The pipes can be designed e.g. as hollow fins, through whose hollow space the transmission oil can be pumped. The ambient air which is sucked in, as it flows around the pipes that transport heated transmission oil from the interior of the transmission, absorbs heat from the pipes and emerges from the fan as heated cooling air.

Ring coolers have long been used for cooling the engines of agricultural machines and military vehicles. The use of a ring cooler as an oil-air heat exchanger for cooling transmissions, in particular bevel helical transmissions, was not previously known. By virtue of using a ring cooler for the purpose of cooling transmissions, in particular bevel helical transmissions, a very effective cooling solution is introduced into a new field of application.

A ring cooler has the advantage of dissipating a large amount of heat on a small volume. Furthermore, it can readily be adapted to the transmission shape, e.g. placed around the drive shaft or a bearing cup of a bevel gear transmission, such that a very compact transmission can be provided in spite of the additional cooling system.

The cooling system can be operated without additional primary energy, since the fan and the pump can be driven by rotating shafts of the transmission.

A further advantage of the invention is that the deployment space of the transmission is not enlarged as a result of the cooling system, in contrast with conventional oil-air coolers. The positioning of the ring cooler around the drive shaft in the fan region results in an optimal utilization of a structural space which is not used in conventional cooling systems.

The invention therefore results in an increase in the heat dissipation of transmissions. In this case, variation of the embodiment of the ring cooler, the fan and the pump makes it possible to adapt the heat quantity that can be dissipated. This means that a possibility for increasing the load of transmissions is achieved, since the thermal load limit can be increased significantly. This effective cooling system nonetheless requires no additional structural space, but represents a very compact cooling solution by virtue of the arrangement of the ring cooler around the drive shaft.

The sucking fan on the drive shaft produces an extensive and effective flow against the ring cooler.

According to a preferred embodiment of the invention, the transmission comprises a pump which is connected into the oil circuit and can be driven by a transmission shaft of the transmission. Said pump is preferably a flange pump which is driven by a shaft of the transmission. In this case, the advantage is that the oil circuit is only active, and therefore oil cooling via the ring cooler only takes place, when the transmission is running, i.e. when thermal waste develops in the transmission. However, said pump can also be a pump which is driven by a motor.

According to a preferred embodiment of the invention, the ring cooler comprises an inlet opening and an outlet opening, via which the ring cooler is connected into the oil circuit, and one or more pipes which surround the drive shaft and run between the inlet opening and the outlet opening. Provision is made for a first oil line connecting the interior of the transmission, preferably the oil sump, to the inlet opening of the ring cooler. Provision is further made for a second oil line connecting the outlet opening of the ring cooler to the interior of the transmission, preferably an oil inlet opening in the vertically upper region of the transmission housing, from where the transmission oil can be guided to cooling points or injection points. From there, the oil flows under gravity into a vertically lower region of the transmission housing, preferably the oil sump, thereby completing the oil circuit.

The ring cooler also has one or more pipes which run between the inlet opening and the outlet opening and through which transmission oil, driven by the pump, can be transported. In this case, the pipes surround the drive shaft in such a way that the ring cooler has an annular form. The pipes which serve to transfer heat from the transmission oil into the ambient air flowing around the pipes are preferably manufactured from a material having good heat conduction, e.g. a metal.

According to a preferred embodiment of the invention, the ring cooler comprises slot-type openings serving as air channels, also referred to as air fins, between the pipes. As a result of the air-guiding hood, the air that is sucked in from the surroundings by the fan flows onto the ring cooler, where it flows through the slot-type openings and past the pipes. The air absorbs heat from the pipes and is pushed radially outwards by the fan into the surroundings as heated cooling air.

According to a preferred embodiment of the invention, the ring cooler has a square shape. In this case, the cooling elements are arranged in the form of a square as viewed in an axial direction and are linked by connecting reservoirs which serve as corner connectors, the four rectangular cooling elements being arranged along the sides of the square and four connecting reservoirs being arranged at the corners of the square. The cooling elements and optionally also the connecting reservoirs are preferably manufactured from a material having good heat conduction, e.g. a metal. As an alternative to a square cross section of the ring cooler, an embodiment having a round cross section of the ring cooler is also possible. The cooling elements each comprise at least one pipe through which the transmission oil can flow; each cooling element preferably has two or more pipes. The parallel pipes are separated from each other by slot-type openings in this case. Fins may be arranged in these slot-type openings, said fins increasing the surface of the ring cooler in order to create a large surface for effective heat dissipation.

The performance characteristics of the cooling system can be influenced by the geometry of the ring cooler. For example, the axial length of the ring cooler can be selected in such a way that it completely covers the tapered neck of the transmission. The size of the surface can be adjusted by the radial thickness of the cooling body. The quantity of cooling air which flows through the ring cooler and therefore the quantity of dissipated heat can be influenced by the dimensioning of the fan and the cooling body. The cooling capacity can likewise be influenced by the volume flow of the pump which produces the oil transport. In this way, the cooling system can be optimally adapted to the heat quantity that must be dissipated.

According to a preferred embodiment of the invention, the ring cooler radially surrounds the drive shaft over its entire axial extent. The advantage in this case is that the whole of the structural space which exists in the region of the drive shaft is used for the arrangement of the ring cooler and therefore for the purpose of cooling. This increases the cooling capacity of the cooling system.

According to a preferred embodiment of the invention, heat conducting fins are arranged in the slot-type openings. The fins, which preferably interconnect adjacent pipes in a honeycombed manner, significantly increase the heat dissipating surface of the ring cooler. This increases the cooling capacity of the cooling system.

According to a preferred embodiment of the invention, the drive shaft is supported in a bearing cup and the ring cooler surrounds the bearing cup as well as the drive shaft. The advantage of a bearing cup is that essentially the same transmission housing can be used for a helical gear transmission and a bevel helical transmission, the only modification for a bevel helical transmission being the addition of a bearing cup or tapered neck.

According to a preferred embodiment of the invention, the fan is an axial fan or a radial fan. The radial fan has the advantage of being effective irrespective of the direction of rotation.

BRIEF DESCRIPTION OF THE DRAWING

These and other features of the invention are derived from the following description of a preferred embodiment variant of the invention, wherein said preferred embodiment variant represents a non-restrictive example and makes reference to the following drawings, the figures in each case being schematic and not full-scale.

DETAILED DESCRIPTION OF PREFERRED EMBODIMENTS

Figure 1:
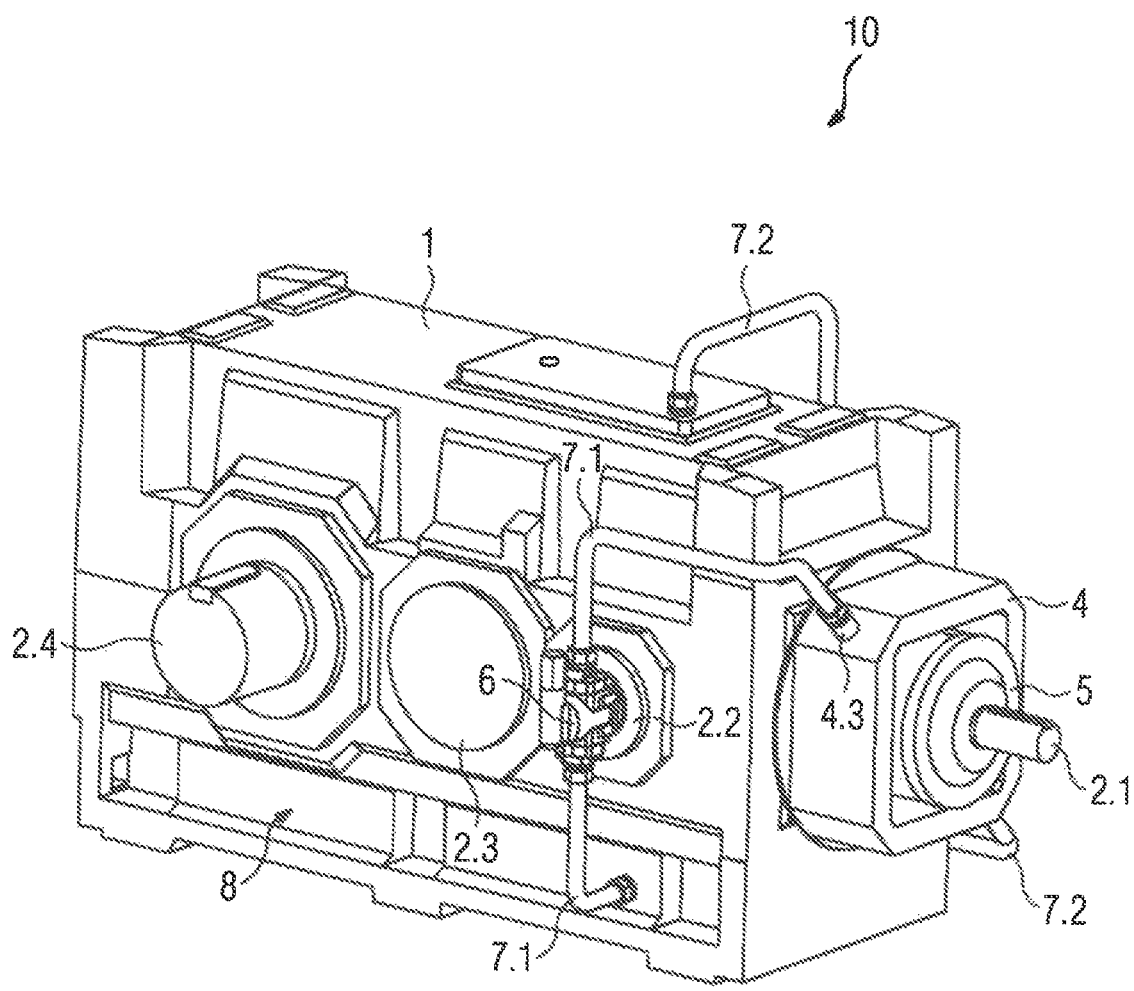
FIG. 1 shows an oblique view of a bevel helical transmission with a ring cooler.

FIG. 1 shows an oblique view of a bevel helical transmission 10 with a ring cooler 4. An essentially cuboid transmission housing 1 comprising two end faces, two side faces, a floor and a lid, has at the drive-side end face a bearing cup 5 in which a drive shaft 2.1 is supported. By means of a bevel stage (not shown) which is arranged in the interior of the transmission housing, the rotation of the drive shaft 2.1 is transmitted to a first intermediate shaft 2.2, which is supported in the two opposing side faces of the transmission housing 1. From there, the rotation is transmitted via a second intermediate shaft 2.3 to a drive shaft 2.4, both of these being supported parallel to the first intermediate shaft 2.2 in the side faces of the transmission housing 1. The drive shaft 2.1 has a feather key for connecting to a motor shaft and the drive shaft 2.4 has a feather key for connecting to a machine.

Situated in the lower region of the transmission housing, i.e. above the floor, is an oil sump 8 where the transmission oil which is contained in the interior of the transmission housing 1 and used for lubrication and cooling collects due to gravitation. A through-hole at which a first oil line 7.1 begins is incorporated in a side face of the transmission housing 1 in the region of the oil sump 8. The first oil line 7.1 leads to a flange pump 6, which is arranged at the end face of the first intermediate shaft 2.2 on the outside of the transmission housing 1. From there, the first oil line 7.1 leads further along the outside of the transmission housing 1 to an inlet opening 4.3 of a ring cooler 4 which radially surrounds the bearing cup 5. From an outlet opening of the ring cooler 4, which is arranged diametrically opposite to the inlet opening 4.3 on the ring cooler 4, a second oil line 7.2 leads along the outside of the transmission housing 1 to a further through-hole, which is incorporated in the lid of the transmission housing 1.

During operation of the transmission 10, a motor turns the drive shaft 2.1, resulting in a slower rotation of the first intermediate shaft 2.2, thereby driving the flange pump 6 which is coupled to the first intermediate shaft 2.2. As a result of this, the flange pump 6 sucks transmission oil through the first oil line 7.1 from the oil sump 8 and pushes it through the ring cooler 4, where the transmission oil is cooled. From the ring cooler 4, the transmission oil passes through the second oil line 7.2 back into the interior of the transmission housing 1.

Figure 2:
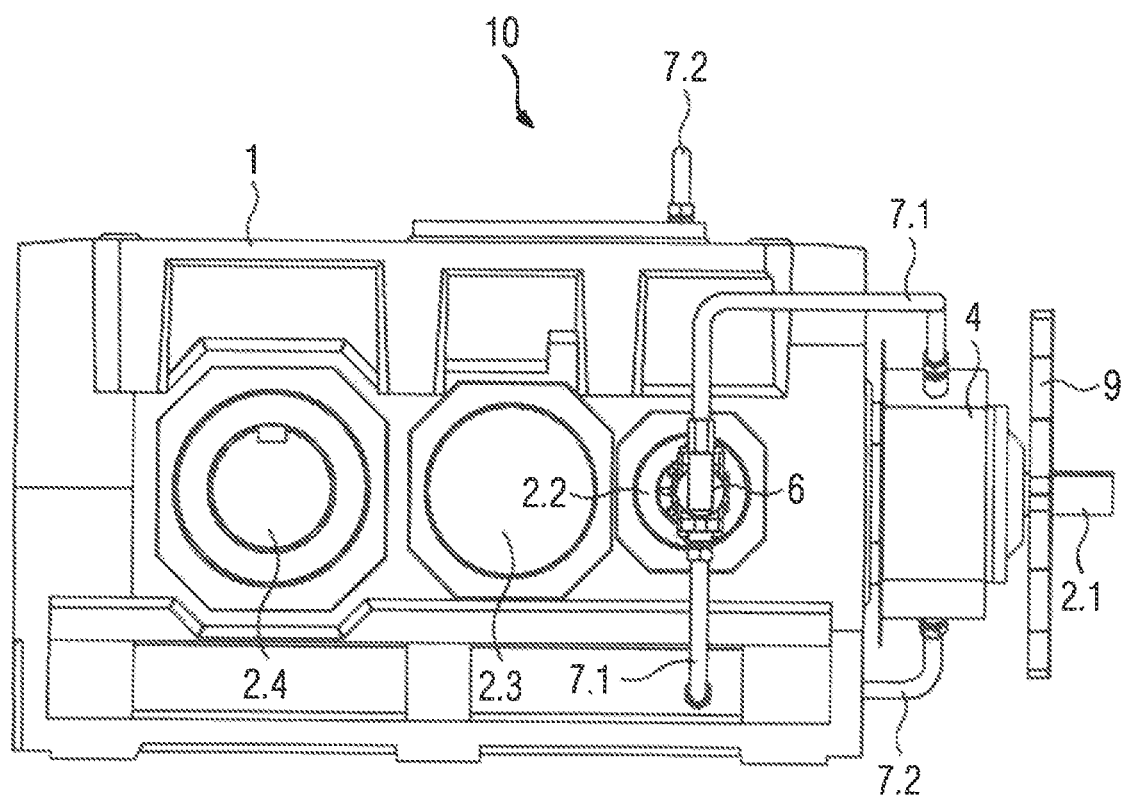
FIG. 2 shows a side view of the bevel helical transmission shown in FIG. 1.

FIG. 2 shows a side view of the bevel helical transmission 10 shown in FIG. 1, a radial fan 9 which is attached to the drive shaft 2.1 being also illustrated. During operation of the transmission 10, a motor turns the drive shaft 2.1, resulting in an equally rapid rotation of the radial fan 9. A rotation of the radial fan 9 results in ambient air being sucked in from that end of the transmission housing 1 which is opposite to the drive-side end face, along the outside of the transmission housing 1 and over the ring cooler 4 to the radial fan 9, where the ambient air that has been sucked in, now heated correspondingly by the absorption of heat from the transmission, is pushed away radially outwards by the radial fan into the surroundings.

Figure 3:
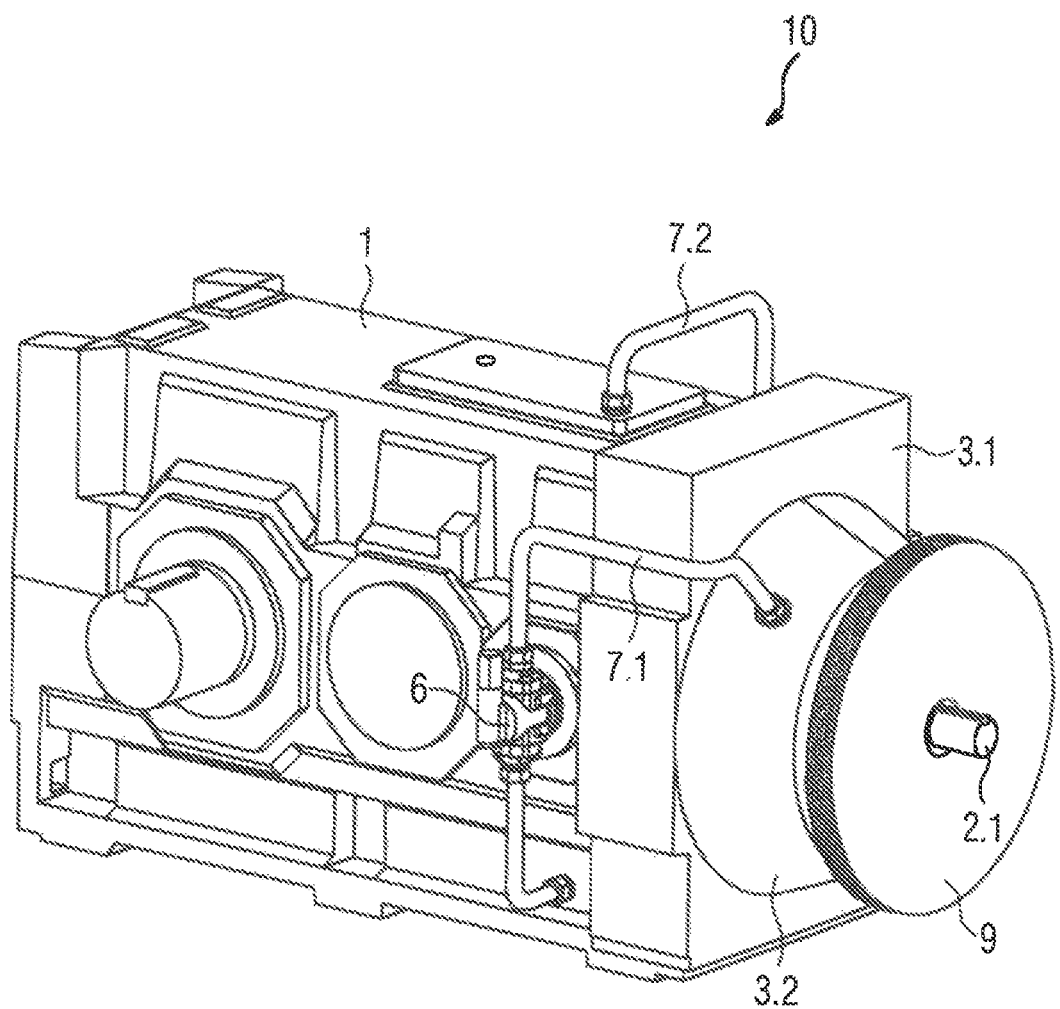
FIG. 3 shows an oblique view of the bevel helical transmission shown in FIG. 1 with a fan hood.

FIG. 3 shows an oblique view of the bevel helical transmission shown in FIG. 2, which is additionally equipped with a fan hood 3.1, 3.2 as per the present invention. The ring cooler 4 surrounding the bearing cup 5 is concealed under the fan hood 3.1, 3.2 in FIG. 3. The fan hood 3.1, 3.2 comprises a tank-shaped part 3.1 having a baseplate at the end face and a circumferential rim, which encloses the drive-side end face and has a gap that is open towards that end of the transmission housing 1 which is opposite to the drive-side end face, said gap being formed between the edge of the air-guiding hood 3.1 and the outside of the transmission housing 1. The fan hood 3.1, 3.2 additionally comprises a neck part 3.2 in the form of a truncated cone which sits centrally on the baseplate of the tank-shaped part 3.1 and radially surrounds the ring cooler 4. In this case, a cutout corresponding to the size of the neck part 3.2 is provided in the baseplate of the tank-shaped part 3.1 at the point of connection with the neck part 3.2, such that ambient air flowing in via the gap of the fan hood 3.1, 3.2 can flow into the interior of the neck part 3.2. The neck part 3.2 is likewise open at its end face which is oriented towards the fan 9, such that ambient air from the interior of the neck part 3.2 can be sucked towards the fan 9. The neck part 3.2 has corresponding through-holes for passing the first oil line 7.1, this leading towards the ring cooler 4, and the second oil line 7.2, this leading away from the ring cooler 4, through the neck part 3.2 of the fan hood.

Figure 4:
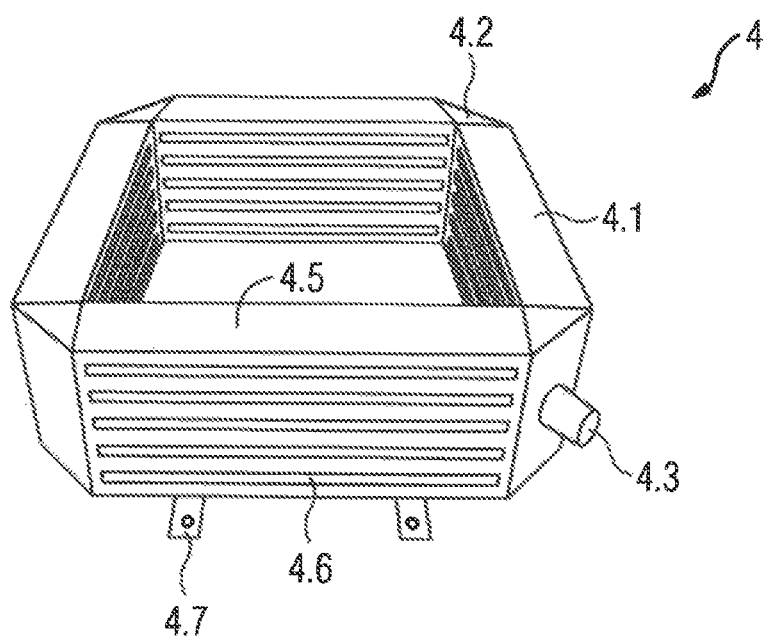
FIG. 4 shows an oblique view of a ring cooler.
Figure 5:
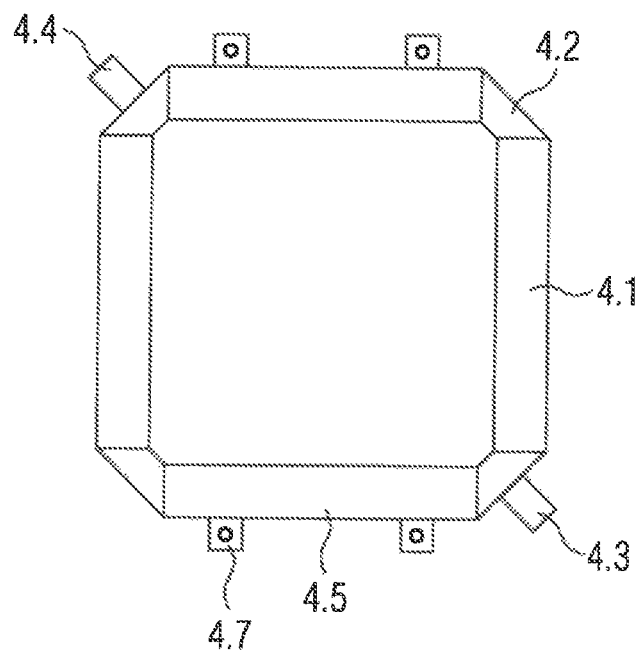
FIG. 5 shows a plan view of the ring cooler shown in FIG. 4.

FIG. 4 and FIG. 5 respectively show oblique and axial views of a ring cooler 4 whose basic shape is square as per the axial view shown in FIG. 5. Four cooling elements 4.1 arranged along the sides of a square are connected at the corners of the square by means of four connecting reservoirs 4.2 which serve as corner connectors. Two diametrically opposed connecting reservoirs 4.2 have respectively an inlet opening 4.3 and outlet opening 4.4. Each cooling element 4.1 has six parallel pipes 4.5 which are separated from each other by intermediate slot-shaped openings 4.6. Air can flow through the slot-shaped openings and can therefore flow around the oil ducting pipes 4.5 on all sides for effective heat transfer. For the purpose of mounting the ring cooler 4 on the end face of the transmission housing 1, the ring cooler 4 has mounting flanges 4.7. After transmission oil enters the inlet opening 4.3, the oil stream divides into two partial streams, a first partial stream flowing "leftwards" and a second partial stream flowing "rightwards" to the outlet opening 4.4 situated opposite. Each of the two partial streams is divided again across the parallel pipes 4.5 of the respective first cooling element 4.1 in the flow direction. At the connecting reservoirs 4.2 serving as corner connectors, the oil streams from the individual parallel pipes 4.5 are mixed together again and then divided again over the parallel pipes 4.5 of the respective second cooling element 4.1 in the flow direction. At the connecting reservoirs 4.2 on the outlet side, all of the oil streams from the two partial streams are mixed together again and flow out through the outlet opening 4.4. By virtue of the open structural format of the ring cooler, cooling ambient air can flow around each pipe 4.5 of the ring cooler.

Figure 6:
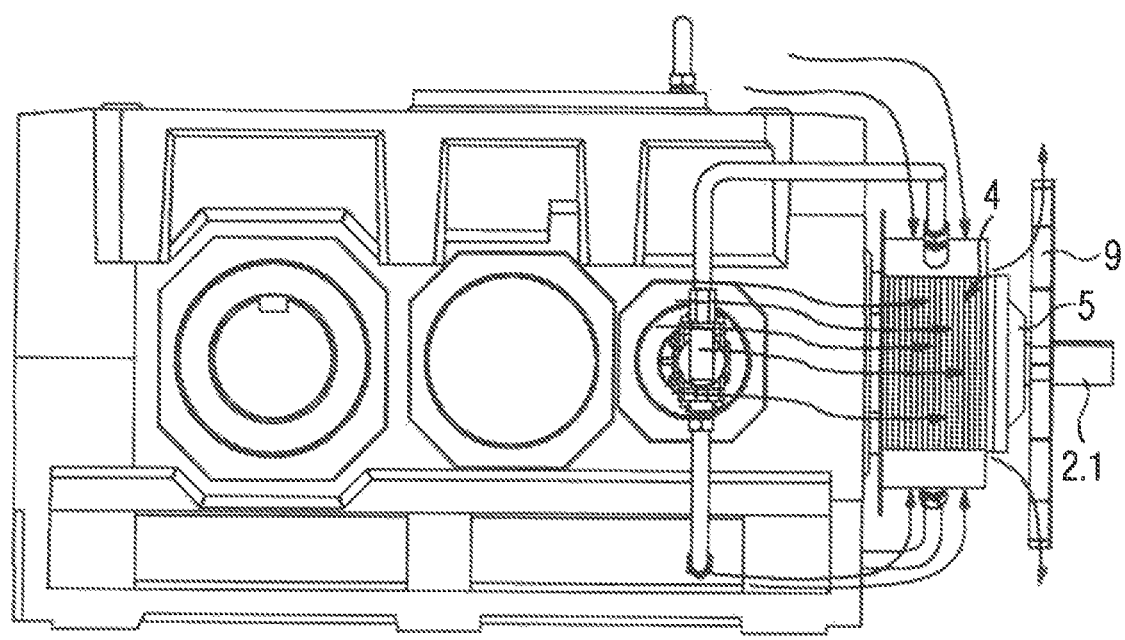
FIG. 6 shows a side view of the bevel helical transmission shown in FIG. 1 with flow lines.
Figure 7:
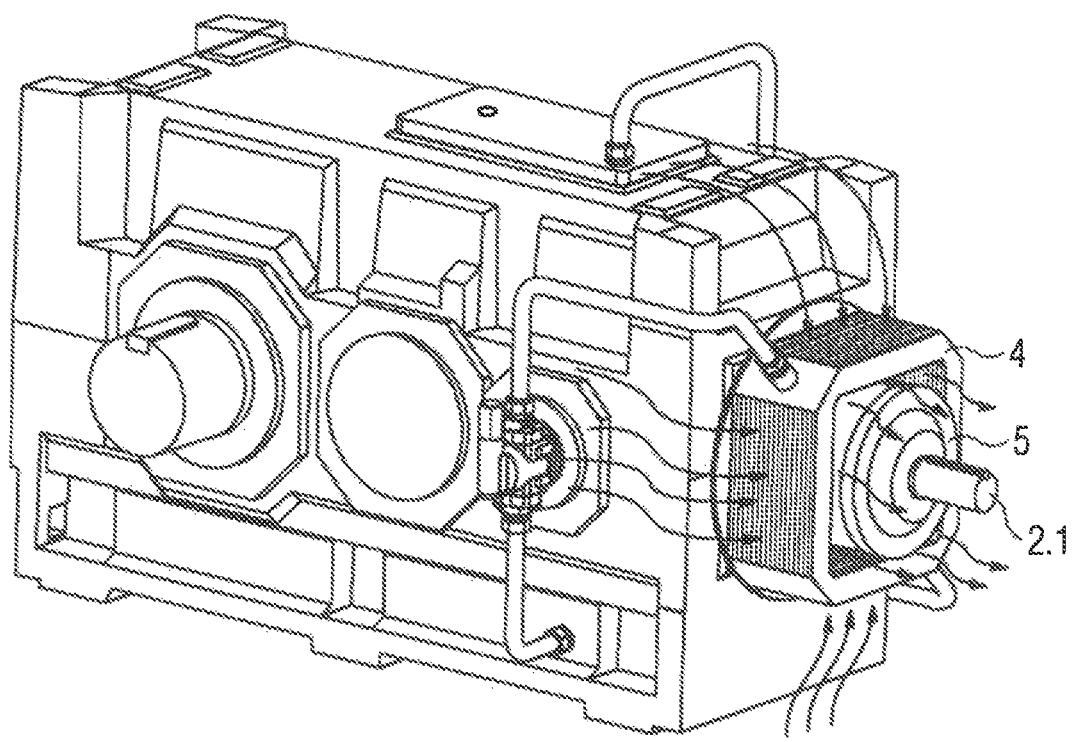
FIG. 7 shows an oblique view of the bevel helical transmission shown in FIG. 1 with flow lines.

FIG. 6 and FIG. 7 show the flow course of ambient air in the region of the ring cooler 4 on the inventive bevel helical transmission as per FIG. 3 in two different views, specifically a side view and an oblique view. The ventilation hood 3.1, 3.2 is omitted in FIG. 6 and FIG. 7 in order to allow better illustration of the flow arrows, but is nonetheless taken into consideration with regard to the course of the flow arrows. The fan wheel of the radial fan 9 is likewise omitted in FIG. 7 in order to allow better illustration of the flow arrows, but is taken into consideration with regard to the course of the flow arrows. A rotation of the radial fan 9 results in ambient air being sucked in from that end of the transmission housing 1 which is opposite to the drive-side end face, along the outside of the transmission housing 1 into the gap of the fan hood 3.1, 3.2 and from there over the ring cooler 4, and in particular through the slot-type openings between the pipes 4.5 of the ring cooler 4, to the radial fan 9, where the ambient air that has been sucked in, now heated correspondingly by the absorption of heat from the transmission, is pushed away radially outwards by the radial fan 9 into the surroundings.

What is claimed is:

1. A transmission, comprising:
   a transmission housing;
   a drive shaft;
   a fan mounted on the drive shaft;
   a ring cooler in surrounding relation to the drive shaft, said ring cooler having a basic shape in the form of a square with four sides and including four cooling elements arranged along the sides of the square;
   connecting reservoirs forming corner connectors disposed at corners of the square for connecting the cooling elements and enabling a mixing of oil streams from parallel pipes of the ring cooler;
   oil lines transporting transmission oil in an oil circuit from an interior of the transmission housing to the ring cooler and from the ring cooler into the interior of the transmission housing; and
   an air-guiding hood in surrounding relation to the ring cooler for guiding air sucked in by the fan onto the ring cooler.

2. The transmission of claim 1, constructed in the form of a bevel helical transmission.

3. The transmission of claim 1, further comprising:
   a pump disposed in the oil circuit; and
   a transmission shaft in driving relation to the pump.

4. The transmission of claim 1, wherein the ring cooler comprises an inlet opening and an outlet opening in fluid communication with the oil circuit, said pipes running between the inlet opening and the outlet opening in surrounding relation to the drive shaft for transporting transmission oil under pressure.

5. The transmission of claim 4, wherein the ring cooler has slot-type openings serving as air channels between the pipes.

6. The transmission of claim 5, further comprising fins arranged in the slot-type openings.

7. The transmission of claim 1, wherein the drive shaft is sized to extend beyond the transmission housing to define an outside region, said ring cooler being sized to radially surround the drive shaft over an entire axial extent of the outside region.

8. The transmission of claim 1, further comprising a bearing cup supporting the drive shaft, said ring cooler configured to also surround the bearing cup.

9. The transmission of claim 1, wherein the fan is an axial fan or a radial fan.

* * * * *